(12) United States Patent
Bryan et al.

(10) Patent No.: US 8,340,427 B2
(45) Date of Patent: Dec. 25, 2012

(54) PROVIDING A SYMBOL

(75) Inventors: John S. Bryan, Fort Wayne, IN (US);
Barry L. Peterson, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 415 days.

(21) Appl. No.: 12/784,048

(22) Filed: May 20, 2010

(65) Prior Publication Data
US 2011/0286664 A1    Nov. 24, 2011

(51) Int. Cl.
*G06K 9/00*    (2006.01)
(52) U.S. Cl. ......................................... 382/181; 382/275
(58) Field of Classification Search ................... 382/181
See application file for complete search history.

(56) References Cited

U.S. PATENT DOCUMENTS

| | | | |
|---|---|---|---|
| 2004/0007121 A1 | 1/2004 | Graves et al. | |
| 2004/0095400 A1* | 5/2004 | Anderson et al. | 345/864 |
| 2005/0015370 A1* | 1/2005 | Stavely et al. | 707/6 |
| 2005/0052714 A1 | 3/2005 | Klug et al. | |
| 2007/0208725 A1 | 9/2007 | Gilger et al. | |
| 2008/0044188 A1* | 2/2008 | Kagawa et al. | 398/128 |

OTHER PUBLICATIONS

Notification of Transmittal of the International Search Report and the Written Opinion of the International Searching authority, or the Declaration, PCT/US2011/033879, date of mailing Oct. 12, 2011, 3 pages.
Written Opinion of the International Searching Authority, PCT/US2011/033879, date of mailing Oct. 12, 2011, 5 pages.
Altman, "Mastering CorelDraw 4", Mastering CorelDraw 4, Jan. 1, 1994, XP007903372, 29 pages.

* cited by examiner

*Primary Examiner* — Hadi Akhavannik
(74) *Attorney, Agent, or Firm* — Daly, Crowley, Mofford & Durkee, LLP

(57) ABSTRACT

In one aspect, a computer-implemented method of providing a symbol includes using a computer to receive a request to provide the symbol, retrieve an image based on the request, modify the image based on the request, convert the image to form the symbol and provide the symbol. In another aspect, an article includes a machine-readable medium that stores executable instructions to provide a symbol. The instructions cause a machine to receive a request to provide the symbol, retrieve an image based on the request, modify the image based on the request, convert the image to the symbol and provide the symbol. In a further aspect, an apparatus to provide a symbol includes circuitry to receive a request to provide the symbol, retrieve an image based on the request, modify the image based on the request, convert the image to the symbol and provide the symbol.

19 Claims, 3 Drawing Sheets

PROVIDING A SYMBOL

BACKGROUND

Symbols are useful for identifying data. In one example, the data may represent persons, places, things, numbers, course, speed, directions and so forth. An important characteristic of symbols when used in a system is that users using the system know what each symbol represents and use them in the same way. In the U.S. military these symbols are standardized. For example, the U.S. Department of Defense uses Military Standard 2525 as a standard for symbols.

SUMMARY

In one aspect, a computer-implemented method of providing a symbol includes using a computer to receive a request to provide the symbol, retrieve an image based on the request, modify the image based on the request, convert the image to form the symbol and provide the symbol.

In another aspect, an article includes a machine-readable medium that stores executable instructions to provide a symbol. The instructions cause a machine to receive a request to provide the symbol, retrieve an image based on the request, modify the image based on the request, convert the image to the symbol and provide the symbol.

In a further aspect, an apparatus to provide a symbol includes circuitry to receive a request to provide the symbol, retrieve an image based on the request, modify the image based on the request, convert the image to the symbol and provide the symbol.

One or more of the aspects above may include one or more of the following features. Retrieving the image based on the request includes retrieving the image based on a symbology source designated by the request. Retrieving the image based on the symbology source includes retrieving the image based on a military standard 2525 source. Retrieving the image based on the request includes retrieving the image from a data store associated with the symbology source. Retrieving the image from the data store includes retrieving the image from one of a vector graphic data store and a 3D model data store. Converting the image to the symbol includes converting the image to one of a portable network graphics (PNG) format, a joint photographic experts group (JPEG) format and a tagged image file format (TIFF). Converting the image to the symbol includes converting the image to a raster image. Modifying the image based on the request includes modifying one of a line width, a line color, color fill and a text label. Receiving the request to provide the symbol includes receiving the request in a uniform resource locator (URL). Receiving the request includes receiving the request in the URL comprising a type of symbology to generate, a symbol designating a name of the symbol to generate, a format defining a format of the symbol to generate and a size of the symbol to generate.

DETAILED DESCRIPTION

Prior art attempts to generate symbols required a large amount of memory resources. In particular, a symbol may be used in multiple applications each requiring different sizing, line widths, colors, text and so forth thus requiring a corresponding separate symbol for each application. This result is a large number of custom libraries. When adding multiple symbol sources, the amount of memory is further increased. Typically in the prior art the symbols are saved in a raster format. Described herein is an approach to generate a symbol that is capable of accessing multiple symbol sources while using less memory resources. The approach described herein provides an extensible, configurable mechanism for generating symbols in a reusable service.

Figure 1A:
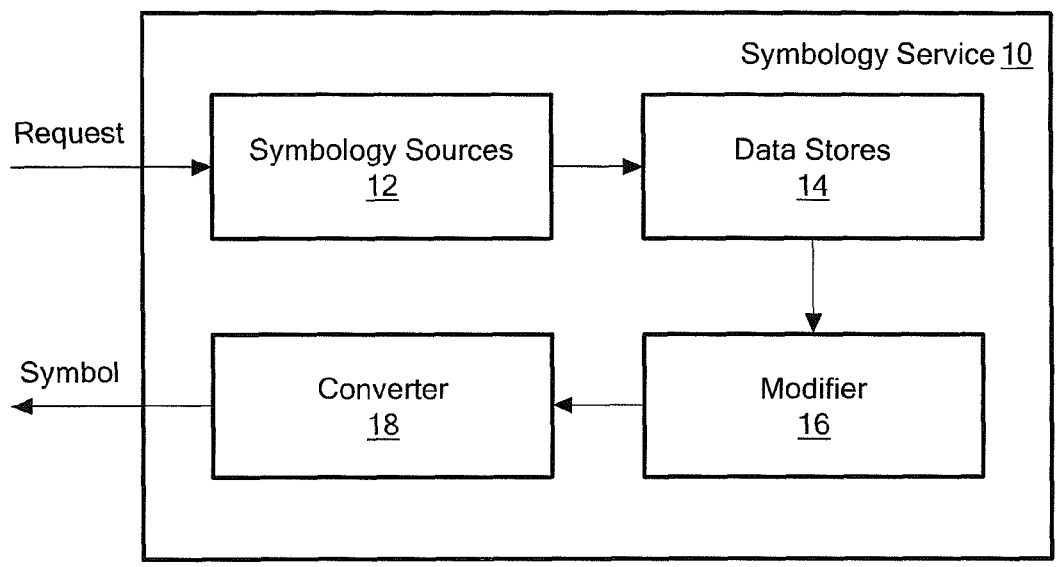
FIG. 1A is a block diagram of an example of a system to provide a symbol.

Referring to FIG. 1A, a symbology service 10 provides symbols based on a request. A symbol may, for example, represent one of a person, groups of people, a place, a thing, a number, a course, a speed and so forth. In one example, the symbology service 10 receives the request from an application. In another example, the symbology service 10 receives the request from a user. In one example, the symbology service 10 is a standalone servlet (e.g., a JAVA® servlet).

The symbology service 10 includes symbology sources 12, data stores 14, a modifier 16 and a converter 18. The symbology sources 12 include one or more sources of symbols. For example, one symbology source may be a Military Standard (Mil-Std) 2525 source that provides military symbols conforming to Mil-Std 2525B and/or 2525C. Other examples of sources of symbology may include a civil source such as the Point Symbology for Emergency Management (as controlled by the American National Standards Institute (ANSI) 415: 2006), a 3D model source (e.g., 3D Collaborative Design Activity (COLLADA) models) and/or custom symbology sources.

The data stores 14 store images of symbols in their raw form meaning not necessarily in the form requested. In one example, the data stores 14 include a vector graphics data store. In one particular example, the vector graphics are stored in extensible markup language (XML) format. In another example, a data store is a 3D model data store which stores 3D models.

The modifier 16 performs operations to modify the images received from the data stores 14. For example, the modifier 16 modifies line widths, line color, fill color and text labels based on the request received.

Figure 1B:
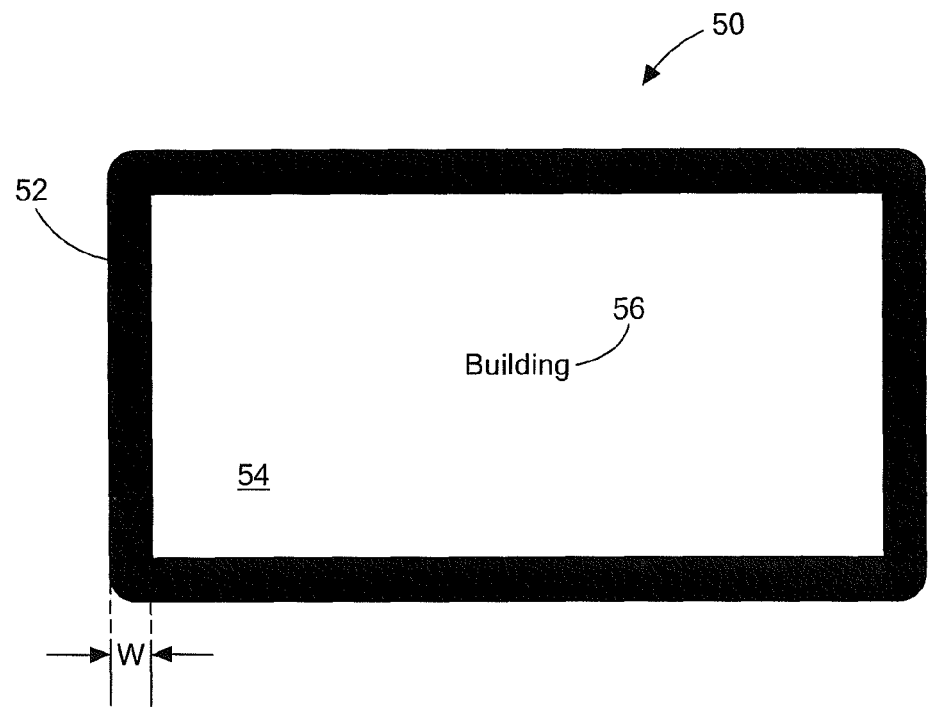
FIG. 1B is an example of a symbol.

Referring to FIG. 1B, in one particular example, a symbol 50 includes a line 52. A line width, W, may be specified to indicate the width of lines within the symbol 50 including the line 52. The line color can designate the color of the lines within the symbol 50 including the line 52. The fill color 54 designates a color to fill an interior 54 of the symbol 50. A text label 56 indicates, for example, a name of the symbol 50.

Referring back to FIG. 1A, in one example, the converter 18 includes a rasterizer to convert a vector graphics format to a raster image for output on a video display or for storage in a bitmap file format. In another example, the converter 18 converts digital images to other digital image formats. For example, vector graphics are converted to portable network graphics (PNG), joint photographic experts group (JPEG) and/or to a tagged image file format (TIFF).

Figure 2:
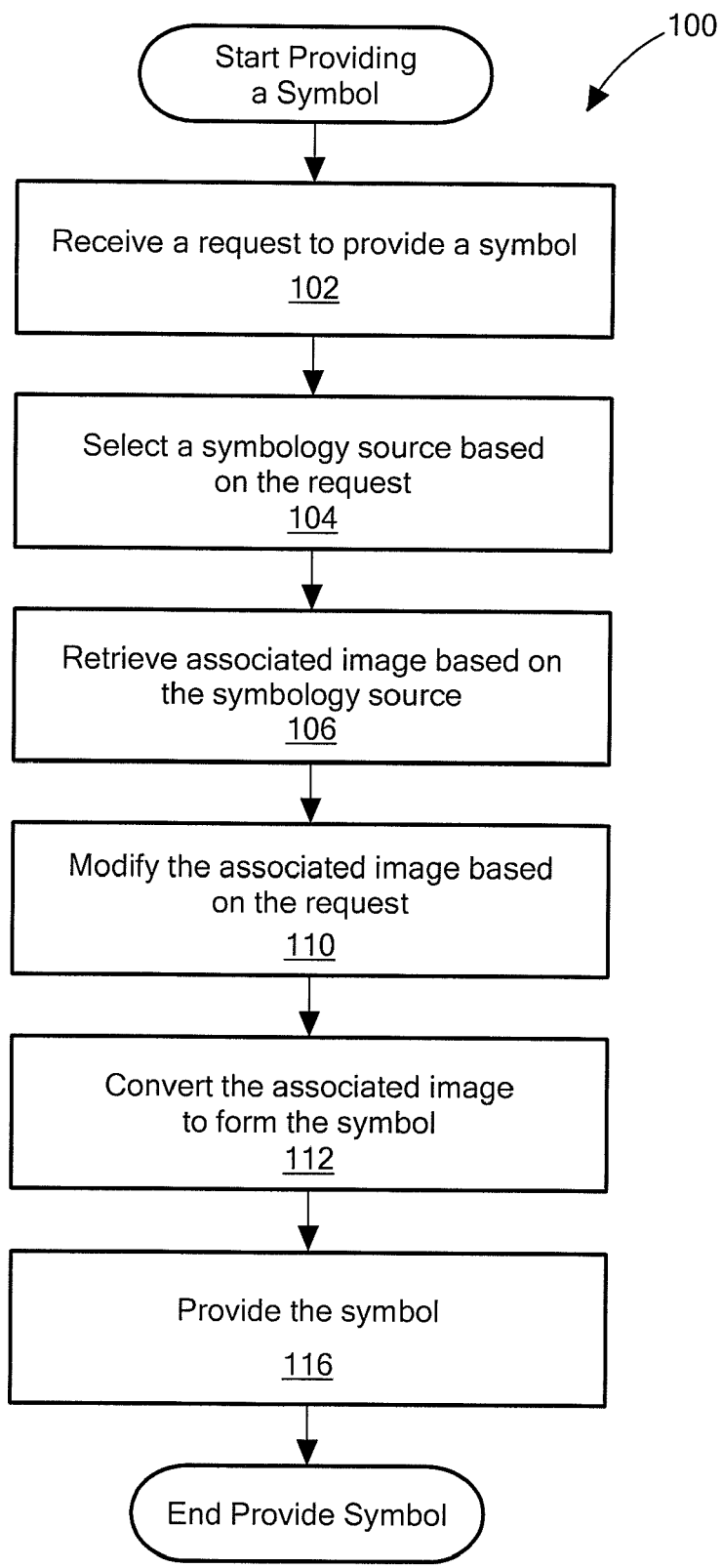
FIG. 2 is a flowchart of an example of a process to provide the symbol.

Referring to FIG. 2, one example of a process to provide a symbol is a process 100. A request is received to provide a symbol (102). For example, the symbology service 10 receives a request. The request includes, for example, a symbology source or type to indicate a source of symbol to generate, a symbol identifier such as a name or ID of the symbol to generate, symbol modifications arguments, a desired format of the resulting symbol format (e.g., PNG, JPG, TIFF and so forth) and a desired size of the resulting symbol. In one example, the symbol modification arguments include parameters to adjust at least one of line color, line widths, fill color, text labels and so forth of the symbol. In one example, the format and size parameters are optional and default to, for example, the PNG format and 80, respectively. In addition to the parameters listed above, specific symbology sources and/or specific symbols may accept additional parameters. For example, point geometries take a number or some other text that is integrated into the icon. This may be supplied by supplying a value for the parameter text.

In one particular example, requests are provided using uniform resource locators (URLs). Examples of URLs include:
http://host:port/
symbology?type=milstd2525b&symbol=sfapmfch-------
format=png&size=80
http://host:port/
symbology?type=milstd2525b&symbol=sjapmf---------
&format=png&size=80
http://host:port/symbology?type=milstd2525b&symbol=g-gpgppk------x&text=8
where "type=milstd2525b" indicates a Mil-Std 2525B source; "symbol=sfaapmfch-------", "symbol=sjapmf---------" and "symbol=g-gpgppk------x" specify the symbol name; "format=png" indicates that the symbol will be presented in a PNG format; "size=80" indicates the size of the symbol in pixels; and "text=8" indicates the text that will be included with the symbol. In this example, if format and size are not included then a default value is used.

A symbology source is selected based on the request (104). The symbology source indicates a source of the symbology. For example, the symbology source may be one of a military standard 2525 source, a civil source, a network source and a 3D model source.

An associated image is retrieved based on the symbology source (106). For example, if the request indicates that a Mil-Std 2525 symbol be used, then the Mil-Std 2525 source that provided the Mil-Std 2525 symbol retrieves an image corresponding to the requested symbol from the appropriate data store 14.

The associated image is modified based on the request (110). For example, the line widths, the fill color, the text label and/or the size of the symbol may be designated based on the request and/or a default.

The associated image is converted based on the request (112). For example, the image is converted from vector graphics to one of PNG, JPG and TIFF formats based on the request or a default.

The symbol is provided (116). In one example, the symbol is provided to an application which in turn overlays the requested symbol on a map or on a photograph (e.g., a satellite photograph).

Figure 3:
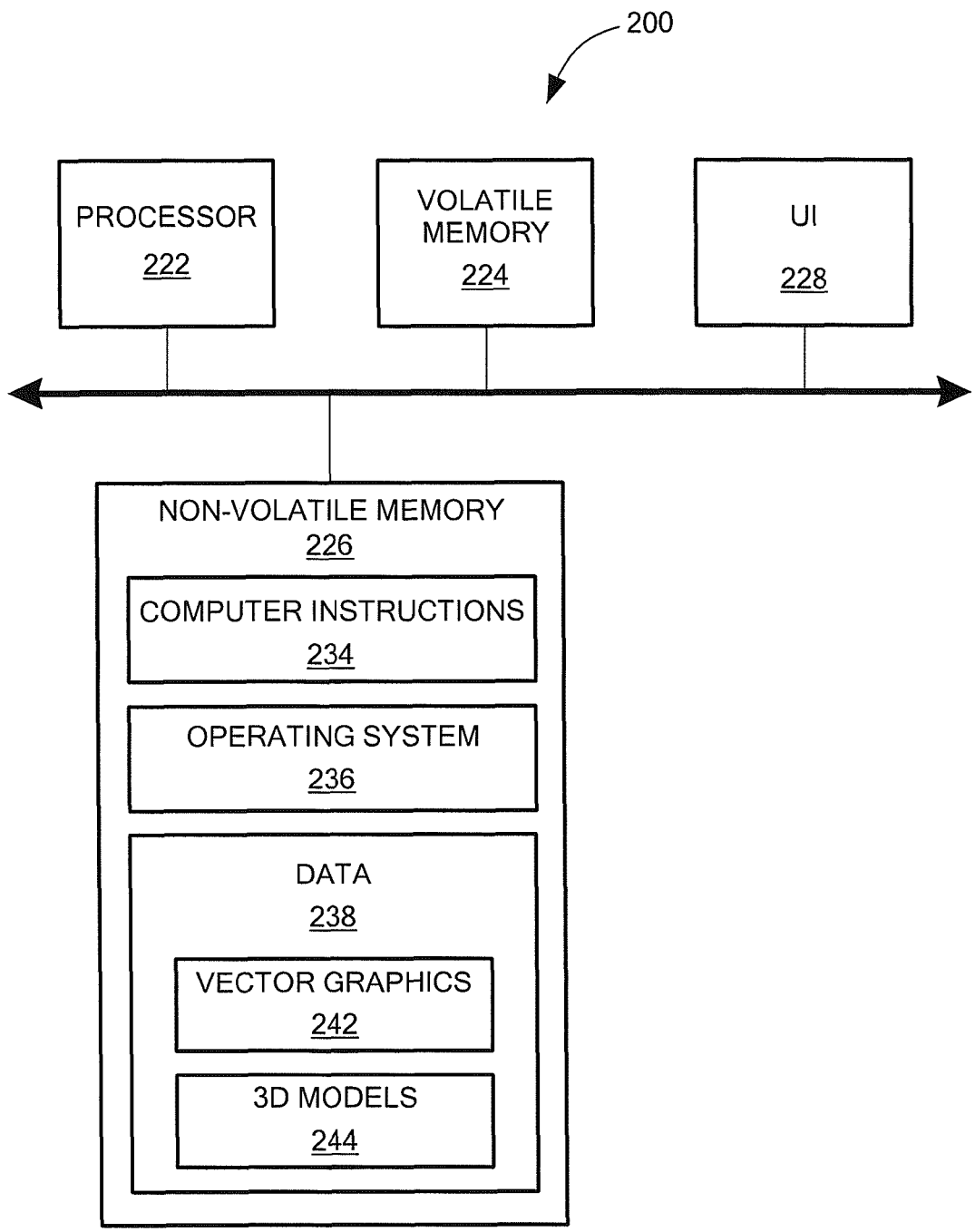
FIG. 3 is a block diagram of an example of a computer for which the process of FIG. 2 may be implemented.

Referring to FIG. 3, an example of a computer to provide symbology is a computer 200. The computer 200 includes a processor 222, a volatile memory 224, a non-volatile memory 226 (e.g., a hard disk) and a user interface (UI) 228 (e.g., a mouse, a touch screen, a keyboard, a display, for example). The non-volatile memory 226 stores computer instructions 234, an operating system 236 and data 238. The non-volatile memory 226 also includes vector graphics 242 and a 3D models 244. In one example, the computer instructions 234 are executed by the processor 222 out of volatile memory 224 to perform all or part of the processes described herein (e.g., the process 100).

The processes described herein (e.g., the process 100) are not limited to use with the hardware and software configuration shown in FIG. 3; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., the process 100). The processes described herein may also be implemented as a machine-readable storage medium, configured with a computer program, where upon execution, instructions in the computer program cause the computer to operate in accordance with the processes.

The processes described herein are not limited to the specific embodiments described. For example, the process 100 is not limited to the specific processing order of FIG. 2. Rather, any of the processing blocks of FIG. 2 may be re-ordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:
1. A computer-implemented method of providing a symbol, comprising;
using a computer to:
receive a request in a uniform resource locator (URL) to provide the symbol, the request comprising a type of symbology to generate, a symbol designating a name of the symbol to generate, a format defining a format of the symbol to generate and a size of the symbol to generate;

retrieve an image based on the request based on a symbology source designated by the request;

modify the image based on the request comprising modifying one of a line width, a line color, color fill and a text label;

convert the image to form the symbol; and provide the symbol.

2. The method of claim 1 wherein using the computer to retrieve the image based on the symbology source comprises using the computer to retrieve the image based on a military standard 2525 source.

3. The method of claim 1 wherein using the computer to retrieve the image based on the request comprises using the computer to retrieve the image from a data store associated with the symbology source.

4. The method of claim 3 wherein using the computer to retrieve the image from the data store comprises using the computer to retrieve the image from one of a vector graphic data store and a 3D model data store.

5. The method of claim 1 wherein using the computer to convert the image to the symbol comprises using the computer to convert the image to one of a portable network graphics (PNG) format, a joint photographic experts group (JPEG) format and a tagged image file format (TIFF).

6. The method of claim 1 wherein using the computer to convert the image to the symbol comprises using the computer to convert the image to a raster image.

7. The method of claim 1 wherein using the computer to modify the image based on the request comprises using the computer to modify two of a line width, a line color, color fill and a text label.

8. An article comprising:

a non-transitory machine-readable medium that stores executable instructions to provide a symbol, the instructions causing a machine to:

receive a request in a uniform resource locator (URL) to provide the symbol, the request comprising a type of symbology to generate, a symbol designating a name of the symbol to generate, a format defining a format of the symbol to generate and a size of the symbol to generate;

retrieve an image based on a symbology source designated by the request;

modify the image comprising modifying one of a line width, a line color, color fill and a text label;

convert the image to the symbol; and provide the symbol.

9. The article of claim 8 wherein the instructions causing the machine to retrieve the image based on the request comprises instructions causing the machine to retrieve the image from one of a vector graphic data store and a 3D model data store associated with the symbology source.

10. The article of claim 8 wherein the instructions causing the machine to convert the image to the symbol comprises instructions causing the machine to convert the image to one of a portable network graphics (PNG) format, a joint photographic experts group (JPEG) format and a tagged image file format (TIFF).

11. The article of claim 8 wherein the instructions causing the machine to convert the image to the symbol comprises instructions causing the machine to convert the image to a raster image.

12. The article of claim 8 wherein the instructions causing the machine to modify the image based on the request comprises the instructions causing the machine to modify two of a line width, a line color, color fill and a text label.

13. An apparatus to provide a symbol, comprising:

circuitry to:

receive a request to provide the symbol in a uniform resource locator (URL) comprising a type of symbology to generate, a symbol designating a name of the symbol to generate, a format defining a format of the symbol to generate and a size of the symbol to generate;

retrieve an image based on a symbology source designated by the request;

modify the image based on the request comprising modifying one of a line width, a line color, color fill and a text label;

convert the image to the symbol comprising converting the image to one of a portable network graphics (PNG) format, a joint photographic experts group (JPEG) format, a tagged image file format (TIFF) and a raster image; and provide the symbol.

14. The apparatus of claim 13 wherein the circuitry comprises at least one of a processor, a memory, programmable logic and logic gates.

15. The apparatus of claim 13 wherein the circuitry to retrieve the image based on the request comprises circuitry to retrieve the image from one of a vector graphic data store and a 3D model data store associated with the symbology source.

16. The apparatus of claim 13 wherein the circuitry to modify the image based on the request comprises modifying two of a line width, a line color, color fill and a text label.

17. The apparatus of claim 13 wherein the circuitry to modify the image based on the request comprises modifying a line width, a line color, color fill and a text label.

18. The method of claim 1 wherein using the computer to modify the image based on the request comprises using the computer to modify a line width, a line color, color fill and a text label.

19. The article of claim 8 wherein the instructions causing the machine to modify the image based on the request comprises the instructions causing the machine to modify a line width, a line color, color fill and a text label.

* * * * *